United States Patent Office 3,849,395
Patented Nov. 19, 1974

3,849,395
DEGRADED MODIFIED SEAWEED EXTRACTIVE AND COMPOSITIONS CONTAINING SAME AND THEIR PRODUCTION
Arthur L. Moirano, Mountainside, N.J., assignor to Marine Colloids, Inc., Springfield, N.J.
No Drawing. Filed Aug. 25, 1971, Ser. No. 175,006
Int. Cl. C07g 3/00
U.S. Cl. 260—209 R                     8 Claims

ABSTRACT OF THE DISCLOSURE

Seaweed extractives, in the form of sulfated hydrocolloids composed essentially of glycosidically linked hexose groups in the form of 3,6-anhydro-d-galactose groups and d-galactose wherein the sulfate content ranges from about 12% to about 35%, are modified by increasing the ratio of 3,6-anhydro-d-galactose groups to d-galactose groups contained therein in the natural state so as to be at least 0.8 to 1 and are further modified by hydrolytic degradation such that the viscosity of the hydrocolloid, wherein the ratio of 3,6-anhydro-d-galactose groups to d-galactose groups is at least 0.8 to 1, when in a water solution at 1.5% concentration and at a temperature of 75° C. is between 0.4 and 4.0 centipoises. The modified hydrocolloids are disclosed as having improved properties in aqueous media as suspending agents and for imparting improved consistency and rheology to products containing them. In the case of iota carrageenan the said modification thereof results in imparting solubility in cold milk.

FIELD OF INVENTION

This invention relates to hydrocolloids which in aqueous media are variously employed as gelling, suspending or stabilizing agents and relates more especially to sulfated hydrocolloids consisting essentially of glycosidically linked hexose groups in the form of 3,6-anhydro-d-galactose groups and d-galactose groups containing sulfate to the extent of about 12% to about 35% by weight of the hydrocolloid, the sulfate being associated with the hexose groups as a half ester.

BACKGROUND OF THE INVENTION

Hydrocolloids of the aforesaid class are extracted from sea plants which contain them by soaking the macerated seaweed in water at elevated temperature, such as 90°–100° C., for several hours whereby the hydrocolloid is caused to go into water solution which thereafter is separated from the residual seaweed as by filtration which usually is assisted by the employment of a filter aid. Usually the water that is used for extraction is rendered mildly alkaline so as to provide a pH of the order of 10 to 12 by the inclusion of an alkaline material such as calcium hydroxide or sodium hydroxide. After the solution containing the dissolved hydrocolloid has been separated from the residual seaweed the hydrocolloid in the solution may be recovered in the form of a solid extractive either by mixing the recovered solution with a hydrophilic liquid such as isopropanol in which the carrageenan is insoluble, thereby causing the carrageenan to be thrown down as a coagulum, or by evaporation of the water from the solution as by drying the solution on a rotary drying drum which presents a heated peripheral surface, namely, by "roll drying."

The most widely employed hydrocolloid of the aforesaid class is carrageenan. It is found in seaweeds of the class Rhodophyceae and, more particularly, in certain seaweeds of the Gigartinaceae and Solieriaceae families. The carrageenan which is most commonly used is that which is derived from red seaweeds such as Chondrus crispus, which also is commonly referred to as Irish moss. The extract obtained from Chondrus crispus forms a gel in water solution, the strength of which is greatly affected by the presence of cations. In the presence of sodium cations the extractive exhibits little gel strength. In the presence of potassium cations the gel strength in water is greatly increased.

It has been ascertained heretofore that the carrageenan derived from Chondrus crispus contains two carrageenan components to which the names kappa carrageenan and lambda carrageenan have been applied. Usually carrageenan extracted from Chondrus crispus contains on the average about 50% to 70% of kappa carrageenan and about 30% to 50% of lambda carrageenan. A procedure for separating and respectively recovering the kappa and lambda components of carrageenan is disclosed in Pat. No. 3,176,003.

It is the kappa component of the carrageenan derived from Chondrus crispus which exhibits gel-forming properties in water solution that are enhanced by the presence of potassium cations. Kappa carrageenan also exhibits some sensitivity to other cations in the enhancement of its water gel strength, e.g. the alkaline earth metals, magnesium and ammonium, but the most pronounced influence in enhacing gelation is occasioned by the presence of potassium cations. Accordingly, kappa carrageenan is recognized as being a carrageenan of the potassium-sensitive type. Kappa carrageenan is characterized by its content of 3,6-anhydro-d-galactose groups alternating with d-galactose-4-sulfate units. However, as kappa carrageenan occurs in nature many of the hexose groups alternating with the d-galactose-4-sulfate groups are not in the form of 3,6-anhydro-d-galactose groups but are d-galactose-6-sulfate groups. Therefore, as kappa carrageenan occurs in nature the ratio of 3,6-anhydro-d-galactose groups to d-galactose-4-sulfate groups normally is less than 0.6 to 1. The sulfate content of kappa carrageenan usually is of the order of 20% to 28% by weight.

Lambda carrageenan is characterized by d-galactose-2,6-disulfate units in association with d-galactose-2-sulfate groups. It does not contain 3,6-anhydro-d-galactose groups and is substantially devoid of any ability to form gel or to precipitate responsive to the cations which induce gelation of kappa carrageenan. Lambda carrageenan has certain properties as regards its effect on viscosity but its chemical composition and properties are such that lambda carrageenan, as such, does not lend itself to utilization according to the present invention. To the extent that it may be present with kappa carrageenan it constitutes a diluent from the standpoint of useful employment in the practice of the present invention.

Potassium-sensitive carrageenan may be obtained from sources other than Chondrus crispus, as is well known in the art. A variety of seaweed wherein the carrageenan contains a very high proportion of the kappa fraction is Eucheuma cottonii. Other varieties of seaweeds from which carrageenan of the kappa type having potassium sensitivity may be recovered are Gigartina stellata, Gigartina pistillata, Gigartina canaliculata, Gigartina chamissoi, Eucheuma edule and Eucheuma okamura.

It has heretofore been recognized that in addition to the kappa and lambda carrageenans the carrageenan derived from certain other seaweed varieties exhibits characteristically different properties as compared with either kappa carrageenan or lambda carrageenan. This type of carrageenan is known as iota carragenan and is recognizable as distinguished from kappa carrageenan by reason of the fact that it exhibits greater water-gel sensitivity to calcium cations than to potassium cations. This sensitivty to calcium cations also distinguishes it from lambda carrageenan. Such cation sensitivity may be determined in a soluton of the iota carrageenan at 25° C. and at 1.5% concentration in the presence of calcium chloride in an amount in the range from 0.1% to 0.2%. The iota carrageenan exhibits greater gel strength responsive to the calcium cations than it does in a corresponding aqueous medium containing potassium chloride instead of calcium chloride. The kappa carrageenan, as noted above, under like conditions exhibits its greatest gel strength in the presence of potassium chloride. The iota carrageenan is also notable for the fact that in the infrared spectrum thereof a strong absorption peak occurs at 805–810 reciprocal centimeters in addition to the absorption peak at 845–850 reciprocal centimeters exhibited by kappa carrageenan. Iota carrageenan chemically is characterized by 3,6-anhydro-d-galactose-2-sulfate groups alternating with d-galactose-4-sulfate groups. However, in nature many of the hexose groups alternating with the d-galactose-4-sulfate groups are in the form of d-galactose-2,6-disulfate groups and the ratio of 3,6-anhydro-d-galactose-2-sulfate groups to d-galactose-4-sulfate groups normally is less than 0.6 to 1. The sulfate content of iota carrageenan usually is of the order of 28% to 35%. The seaweed varieties most extensively employed as a source of iota carrageenan are *Eucheuma spinosum* and *Agardhiella tenera*. Other seaweeds of the more available varieties that contain iota carrageenan are *Eucheuma isiforme, Eucheuma uncinatum, Eucheuma serra, Eucheuma gelidium, Agardhiella coulterii, Gymnogongrus norvegicus, Gymnogongrus furcellatus* and *Ahnfeltia durvillaei*.

Another sulfated hydrocolloid illustrative of the class hereinabove referred to is furcellaran. It is recovered from furcellaria seaweed.

As with kappa carrageenan, furcellaran exhibits gelforming properties which are enhanced to the greatest extent by the presence of potassium ions. Furcellaran is characterized by its content of 3,6-anhydro-d-galactose groups alternating with either d-galactose groups or d-galactose-4-sulfate groups. However, as furcellaran occurs in nature the ratio of 3,6-anhydro-d-galactose groups to d-galactose groups in the sulfated and unsulfated condition is less than 0.6 to 1. The sulfate content of furcellaran is of the order of 12%–17%.

It is to be understood that kappa carrageenan, iota carrageenan and furcellaran are merely illustrative of the above-defined class of hydrocolloids with which this invention is concerned. Another hydrocolloid within the defined class is hypnea.

For purposes of brevity, references herein and in the claims to the ratio of 3,6-anhydro-galactose groups to galactose groups are to be understood as having general application without regard to the extent, if any, of the sulfate content of these groups. It also is to be understood that the so-expressed ratio is with reference to 3,6-anhydro-d-galactose groups and d-galactose groups.

Hydrocolloids of the aforesaid class have the capacity to form water gels especially in the presence of those cations that enhance gel-forming properties depending on the particular hydrocolloid that is employed. They also are reactive with milk proteins to form strong gels wherein gel strength is imparted by the combined effect of water gelation and reaction with milk protein with the creation of a gel-forming complex. While sharing in these common properties, different members of the class exhibit properties that are somewhat different from the properties of the others as hereinabove illustrated.

As they occur in nature, hydrocolloids of the aforesaid class contain less than 0.6 to 1 of anhydrogalactose to galactose units. The lower this ratio, the lower the gel strength of the extractive, everything else being equal. Alkaline modification, as will be described hereinbelow, will greatly enhance gelling potential by increasing the ratio of anhydrogalactose to galactose. Theoretically, the highest gel strength would be achieved with a 1:1 ratio. In practice, it is desirable to obtain a ratio which is 0.8 to 1 or greater. While kappa carrageenan, iota carrageenan and furcellaran have been extensively used in food applications for many years, there are a number of potential applications for which neither the naturally-occurring extracts nor the alkali-modified extracts are suitable.

It is the object of this invention to prepare red seaweed polysaccharides which have been modified so as to possess new and commercially valuable properties. For example, there has been a need for a product which could be drymixed with cocoa and sugar and which would produce a stabilized chocolate milk drink when spoon-stirred into the milk. There has been a need for a product which could be utilized in the preparation of a fluid chocolate syrup which could be diluted with milk to produce a stabilized cocoa suspension. There has been a need for a product which could produce a syrup thin enough to be incorporated into an aerosol can and which upon addition to milk would produce a stable drink and/or shake. There has been a need for a product which could be incorporated into high sugar solids systems such as maple syrups which would yield a smooth, spreadable jelly consistency.

Aqueous extractives of the red seaweed polysaccharides which exhibit potassium and/or calcium sensitivity, i.e. which are caused to gel by the presence of these cations, do not yield products which can successfully be used in the aforementioned systems. Said extractives are completely insoluble in cold milk systems whether they are added directly to cold milk or in the form of a fluid syrup which is added to the cold milk. Alkaline modification of these extractives further induces insolubility in cold milk systems. Aqueous extracts of the potassium-sensitive type remain insoluble in cold milk systems even after having been subjected to extensive hydrolysis. Aqueous extracts of the calcium-sensitive type show improved solubility in cold milk systems when subjected to hydrolysis but do not possess sufficient inherent protein reactivity to perform the functions of stabilization.

One of the objects of this invention is to subject a calcium-sensitive extractive to the combined modifying effects of treatment with alkali and of degradative hydrolysis, thereby developing cold milk solubility characteristics with sufficient protein reactivity to produce a stable system.

Aqueous extracts of the potassium- and calcium-sensitive type as they occur in nature do not work effectively in high sugar solids systems to produce spreadable jellylike consistencies. The calcium-sensitive types tend to be insoluble while the potassium-sensitive types are soluble but produce a runny, stringly consistency at low levels of use and produce a firm, not easily gel at high levels of use with no transition through a jelly consistency in going from a fluid consistency to a solid gel. Alkaline modification of the potassium- and calcium-sensitive types results in further insolubility of the calcium-sensitive type in high sugar solids systems. As regards the potassium-sensitive type, solubility is retained but, again, a jelly-like consistency cannot be achieved regardless of the concentration employed. The transition that takes place is strictly from a fluid to a gel. Hydrolysis of the aqueous extracts of the calcium- and potassium-sensitive types will not permit achievement of the desired consistency. On the other hand, alkaline modification of a potassium-sensitive type extractive in combination with its hydrolysis to a very low molecular weight, as will be defined hereinbelow, does permit the attainment of an easily-spreadable jelly-like consistency.

More generally, this invention involves the combined hydrolysis and alkaline modification of both calcium and potassium types of red seaweed polysaccharides. As will be shown, it is immaterial whether the alkaline modification is done first followed by the modification. In the practice of this invention the alkaline modification serves to maximize the gel potential of either the calcium- or potassium-sensitive polysaccharide and the hydrolysis serves to bring the molecular weight into a range where gel-forming tendency can be precisely controlled. By selective hydrolysis, the gel-forming tendency may be regulated so that it is neither too runny nor too firm but serves to produce a jelly-like transition between a fluid and gel state.

It is recognized in the art that hydrocolloids of the class aforesaid are subject to degradative hydrolysis with resultant decrease in visocsity characteristics as well as decrease in gelling potential. Prolonged exposure to elevated temperature in an aqueous medium in itself will result in substantial degradation of carrageenan. It is further known that the degradation may be greatly accelerated under acid conditions and various acids have been used such as sulphuric acid, hydrochloric acid, acetic acid and the like. For example, the pH of the aqueous medium in which the hydrocolloid is dispersed may be reduced to around 3. If the solution likewise is then heated the degradation is accelerated. Restoration of the aqueous medium to ambient temperature and a substantially neutral condition as by the addition of a suitable alkaline material stops the degradation. It is also known that if hydrogen peroxide is dispersed in an aqueous medium containing the hydrocolloid it exercises a degradative effect. The degradation of the hydrocolloid may be cause to occur by expedients such as those mentioned when the hydrocolloid is contained in the seaweed or after the hydrocolloid has been recovered from the seaweed as an extract. When the hydrocolloid is subjected to degradative hydrolysis while it is still contained in the seaweed, the resulting reduction in the viscosity characteristics of the hydrocolloid facilitates its recovery from the seaweed.

GENERAL STATEMENT OF THE INVENTION

It has been found, according to this invention, that hydrocolloids of the above-defined class may be modified so as to acquire novel modified properties having utility in a variety of commercially significant applications for which the unmodified hydrocolloid is not suitable or is less suitable. According to this invention, the defined hydrocolloid is modified to impart useful modified properties by the combined steps of (a) subjecting the hydrocolloid to treatment in an aqueous medium at elevated temperatures in the presence of alkali that increases the ratio of 3,6-anhydro-galactose groups to galactose groups so as to be at least 0.8 to 1, and (b) subjecting the hydrocolloid to degradative hydrolysis which decreases the viscosity at 75° C. of a 1.5% water solution of the said hydrocolloid wherein the ratio of 3,6-anhydro-galactose groups to galactose groups is at least 0.8 to 1 so that the viscosity of the hyrrocolloid becomes drastically reduced, namely, so as to be between 0.4 to 4 centipoises at 75° C. For example, the viscosity of modified kappa carrageenan preferably is reduced so as to from about 0.6 to about 2.0 centipoises at 75° C. at 1.5% concentration. In the case of modified iota carrageenan the viscosity under such conditions is preferably reduced so as to be from about 0.7 to about 3 centipoises. In the case of modified furcellaran under such conditions, it is preferable to reduce its viscosity so as to be from about .6 to about 2.0 centipoises.

The enhancement of gelling properties as such both as regards water gels and milk gels which results from the alkali treatment of hydrocolloids of the class under present consideration is disclosed in U.S. Pat. No. 3,094,517. Generally speaking, according to the treatment disclosed in said patent the hydrocolloid is subjected while in an aqueous medium to a temperature of about 80° C. to 150° C. in the presence of an alkali which raises the pH to above 10. In typical practice, the alkaline material that is employed is calcium hydroxide. However, as stated in said Pat. No. 3,094,517, other alkaline materials may be used such as sodium carbonate, trisodium phosphate, sodium metaborate, soidum hydroxide, potassium hydroxide, barium hydroxide and strontium hydroxide. The heat treatment usually extends throughout a period of 2 to 6 hours, although a more extended heat treatment is also suitable, such as 24 hours as described in the above-mentioned patent. The gel-forming properties of the hydrocolloid are greatly enhanced by the treatment with alkali at elevated temperature. This increase is accompanied by an increase in the ratio of 3,6-anhydro-galactose groups to galactose groups and by a substantial lowering of the viscosity-imparting characteristics of the hydrocolloid. The increase in gel-forming properties which is required in order to obtain the benefits of this invention is attained when the ratio of 3,6-anhydro-galactose groups to galactose groups is 0.8 to 1 or greater up to the theoretical ideal of 1:1. The relative content of the 3,6-anhydro-galactose groups and galactose groups is readily determinable by well known analytical procedures. More generally, this step in modifying the hydrocolloid utilizes treatment in the known manner disclosed in Pat. No. 3,094,517 until the aforesaid ratio is at least 0.8 to 1. This ratio relationship has applicability solely to the ratio relationship as it occurs in the hereinabove defined hydrocolloid. For example, in a mixture of kappa carrageenan and lambda carrageenan the said ratio is based on the kappa component only.

The hydrolytic degradation step lowers the viscosity characteristics of the hydrocolloid wherein the ratio of 3,6-anhydro-galactose to galactose is at least .8 to 1 until the viscosity of a 1.5% solution at 75° C. is from about 0.4 to 4.0 centipoises. It may be accomplished in any desired way. Moreover, it is immaterial whether the degradation is caused to occur before the enhancement of gelling properties by alkali treatment at elevated temperatures or after such alkali treatment. More briefly, this invention resides in the combined steps of increasing the gel-forming potential of the hydrocolloid of the defined class by altering its chemistry and also subjecting the hydrocolloid to very extensive hydrolytic degradation. While the extensive hydrolytic degradation not only greatly decreases the viscosity characteristics of the hydrocolloid at 75° C. but also greatly decreases the gel-forming properties of the hydrocolloid, it is essential in order to obtain the valuable new properties with which the modified hydrocolloid of this invention is endowed to likewise chemically alter the colloid in respects which increase the gel-forming properties of the hydrocolloid.

The conditions for the extraction of the seaweed may advantageously be combined with the alkali treatment as disclosed in Pat. No. 3,094,517 by cooking the seaweed preliminary to the extraction in the presence of an alkali such as lime for several hours at a temperature of the order of 80° to 90° C. After the alkaline-cooking step the dissolved hydrocolloid is separated from the seaweed by filtration. Thereafter the degradation of the hydrocolloid may be accomplished as by acidification of the filtrate so as to reduce the pH to approximately 3. Continued heating for an appropriate period of time, usually several hours, at a pH of about 3 and a temperature of about 80° C. will effectively reduce the viscosity of the hydrocolloid to the desired range. After neutralization the hydrocolloid may be recovered by known procedures such as alcohol precipitation or roll drying.

Alternatively, the seaweed may be treated under conditions such that hydrolysis takes place as by acidification or by the use of hydrogen peroxide followed by treatment to enhance the gelling properties in which the seaweed is mingled with alkali so as to afford the conditions for alkali treatment hereinabove mentioned whereby the ratio of 3,6-anhydro-galactose groups to galactose groups is increased until it is at least 0.8 to 1. Following these treatments the hydrocolloid may be recovered by separation of solution containing the dissolved hydrocolloid from the seaweed by filtration whereupon the hydrocolloid is reduced to solid form as by alcohol precipitation or roll drying.

Hydrocolloids which have been subjected to the aforesaid treating steps are new products that exhibit novel and valuable properties particularly as regards their utility in suspending particulate insoluble materials in aqueous media and imparting desired rheology to aqueous compositions.

In the case of iota carrageenan the modifying treatment renders it soluble in cold milk wherein it is highly effective in preventing the settling of cocoa particles of cold-mix chocolate milk beverages. The modified iota carrageenan likewise effectively prevents the settling of cocoa particles in a chocolate syrup which is notable for its high degree of fluidity. In fact, the novel syrup may be employed in a container of the aerosol type from which the syrup is readily dispensable into cold milk to provide a chocolate milk beverage in which the cocoa particles are non-settling.

Instead of utilizing the modified iota carrageenan in a chocolate syrup it may be employed as an ingredient of a dry particulate composition which contains cocoa particles in combination with suitable sweetening and flavoring agents and which when added to cold milk provides a chocolate milk beverage in which there is no settling of the cocoa particles.

At greater concentrations of the midified hydrocolloid compositions of spreadable consistency are afforded which are free of pastiness and stringiness. A smooth consistency of short-flow rheology is afforded which is not attainable at any concentration when using a hydrocolloid which has not been modified according to this invention. The treated hydrocolloids of this invention are specially suitable when employed in chocolate or fruit syrups and in jellies of various types.

DETAILED DESCRIPTION

Further features and advantages of this invention will be apparent from the following illustrative examples:

Example 1

This example illustrates treatment of iota carrageenan to produce as a new product modified iota carrageenan that possesses valuable improved properties. The extractable hydrocolloid contained in *Eucheuma spinosum*, which is employed in this example, normally consists almost entirely of iota carrageenan. This example also illustrates subjection of the hydrocolloid to the alkali treatment step while it is still in the seaweed followed by the hydrolytic degradation step after separation of solution containing the modified hydrocolloid for residual seaweed.

Four kgs. of *Eucheuma spinosum* were washed in 9 gals. of water for one-half hour and drained. The seaweed was placed in a cooker with 20 gals. of hot water at 90° C. containing 280 gms. of calcium hydroxide (7% on the weight of the dry weed). After soaking for 15 minutes, the volume was made up to 27 gals. of hot water and cooking was continued for 1 hour at 90°–100° C. while subjecting the weed to mild agitation with resultant increase in gel-forming properties due to increase in the ratio of 3,6-anhydro-galactose groups to galactose groups. During this cooking period the weed broke down rapidly and after 45 minutes of cooking, 10 lbs. of diatomaceous earth was added and was allowed to become mixed with and distributed throughout the mass. At the end of one hour the mass was adjusted to a pH of 8 by the addition of hydrochloric acid and the solution of modified iota carrageenan was separated from the seaweed by filtration.

After filtration sufficient citric acid was added to the filtrate to reduce the pH to approximately 3. The acidified filtrate was heated to about 180° F. and cooking at this temperature was continued for 4 hours. The solution was then brought back to a pH of about 7 by the addition of sodium hydroxide and promptly cooled to ambient temperature.

The resulting degraded modified iota carrageenan was recovered by adding the solution to 2.5 volumes of 85% isopropanol per volume of filtrate. The coagulum was drained, washed with 85% isopropanol, dried and ground. The recovered product was readily soluble in water and its viscosity in water solutions at 75° C. and at a concentration of 1.5% was 1.0 centipoise. The ratio of 3,6-anhydrogalactose groups to galactose groups was about .02 to 1 and the sulfate content was 32% by weight. The degraded modified iota carrageenan acquired solubility in cold milk.

Example 2

This example illustrates the practice of this invention wherein the seaweed is subjected to hydrolytic degradation followed by the alkali treatment at elevated temperature. This example also illustrates hydrolytic degradation of the hydrocolloid while in the seaweed and in the presence of hydrogen peroxide, the effectiveness of the hydrogen peroxide being enhanced by pre-treatment with ferrous sulfate solution containing sodium sulfoxalate formaldehyde.

650 gms. of *Eucheuma spinosum* were soaked for 2 hours in 8 liters of tap water containing 1 gm. of sodium sulfoxalate formaldehyde and 0.0029 mole per liter of ferrous sulfate heptahydrate at room temperature (about 28° C.) and at a pH of about 7. Excess ferrous sulfate solution was drained off and the weed was soaked in 8 liters of 0.019 molar hydrogen peroxide solution for 3 hours at room temperature and at a pH of 6.0 in order to produce the desired hydrolytic degradation. The water to weed ratio was 12 to 1.

50 gms. of calcium hydroxide (lime) were then added and the mixture was heated on a boiling water bath for 2 hours with mild agitation. The resulting extract was filtered and neutralized with hydrochloric acid from pH 10.9 to 7.2. One portion of the filtrate was coagulated by adding it to 2.5 volumes of 85% isopropanol per volume of filtrate and the coagulum was washed with isopropanol, dried and ground so as to pass a standard 270-mesh sieve. The viscosity of the recovered carrageenan was 1.5 centipoises. Another portion of the filtrate was dried by roll drying and ground to 270 mesh. Its viscosity was 1.02 centipoises. In each case the ratio of 3,6-anhydro-galactose groups to galactose groups was about .92 to 1 and the sulfate content was approximately 32% by weight.

Example 3

This example illustrates treatment of kappa carrageenan to produce as a new product a modified, hydrolyzed kappa carrageenan that possesses valuable improved properties.

*Chondrus crispus* seaweed was aqueous-extracted with 21% calcium hydroxide (based on dry weight of weed) and cooking was continued for 18 hours at 200° F. After filtration, 1 volume of solution was added to 2.5 volumes of isopropyl alcohol. The coagulated carrageenan was then drained and squeezed.

300 gms. of the carrageenan were added to a mixture of 900 gms. isopropyl alcohol (99%) and 180 gms. of water; 75 gms. of 1N HCl were added and the whole refluxed for 4 hours. Neutralization was carried out with 75 gms. 1N NaOH. The coagulum was drained, squeezed and washed with 500 mls. of 99% isopropyl alcohol, then dried.

The resulting degraded modified kappa carrageenan had a ratio of 3,6-anhydro-galactose groups to galactose groups of .95 to 1 and the sulfate content was 26% by weight.

Example 4

This example illustrates treatment of Furcellaria weed to produce as a new product a modified, hydrolyzed furcellaran that possesses valuable improved properties.

The Furcellaria seaweed was extracted, modified and hydrolyzed as in Example 3. The resulting degraded modified furcellaran had a ratio of 3,6-anhydro-galactose to galactose groups of .92 to 1 and the sulfate content was 13% by weight.

The following examples are illustrative of novel products having improved properties imparted by the utilization of degraded modified hydrocolloids as hereinabove described and exemplified:

Example A

This example illustrates the usage of modified iota carrageenan embodying this invention in an aqueous chocolate syrup having unique properties and having utility for use in making a chocolate milk beverage merely by its addition to cold milk and mild stirring. The following is a typical formulation:

|   | Gms. |
|---|---|
| Sugar | 275.0 |
| Cocoa | 45.0 |
| Salt | 2.5 |
| Sodium benzoate | 0.5 |
| Water | 176.0 |
| Degraded modified iota carrageenan | 1.0 |

The degraded modified iota carrageenan, as prepared in Example 1, had a viscosity of 0.832 centipoise at 1.5% concentration at 75° C. The ratio of 3,6-anhydrogalactose groups to galactose groups was about .92 to 1. The syrup was prepared by moderately heating the water to which the dry ingredients had been added so as to facilitate the dissolution of the solid ingredients other than the cocoa particles which became dispersed in the form of a suspension. The preparation was cooled to room temperature. It had a viscosity of 2000 centipoises at 25° C. as measured by a Brookfield viscometer and was extremely fluid. The syrup was readily miscible with cold milk at the ratio of 1 part syrup to 10 parts milk to produce a stabilized chocolate milk drink with excellent body and cocoa suspension.

For comparison, a syrup of corresponding formulation was prepared in the described manner except that the iota carrageenan was iota carrageenan that had been subjected to the alkali treatment but without hydrolytic degradation, its viscosity at 1.5% concentration in water and at 75° C. being 30 centipoises. The resulting syrup was heavily gelled and could not be poured. Moreover, it was not miscible with cold milk. The undegraded iota carrageenan was then used at a lesser concentration to produce a thinner syrup. The thinner syrup was miscible with cold milk but the carrageenan became insolubilized by the milk protein and no cocoa suspension was achieved. In the case of untreated iota carrageenan either the syrup gelled or the cocoa particles were not suspended. If the natural iota carrageenan was degraded but not alkali-treated, either the syrup was excessively viscous or the cocoa particles were not suspended.

The syrup of this example was placed in a container of the aerosol type, namely, in a can under the influence of a compressed gaseous propellant so as to be releasable through an outlet orifice responsive to a manually-activated valve. Because of its fluidity the syrup could readily be expelled through the discharged orifice into cold milk to produce a stabilized chocolate milk drink.

A highly fluid chocolate syrup such as that exemplified containing appropriate flavoring materials including cocoa particles that are dispersed in the water may contain as a stabilizing agent from about .05% to about 1.0% by weight of the degraded modified iota carrageenan that has a water viscosity at 75° C. and at 1.5% concentration between about .7 to about 1.0 centipoise. While iota carrageenan is normally employed, another hydrocolloid within the above-defined class and having the aforesaid viscosity could be used wherein the sulfate content is from about 12% to about 35% and the ratio of 3,6-anhydrogalactose groups to galactose groups is at least 0.8 to 1.

Example B

This example illustrates the employment of degraded modified carrageenan, as prepared in Example 2, in a chocolate spread. The composition of Example A was prepared except that about 4.0 gms. of the degraded modified iota carrageenan was employed. The finished product had a very desirable short-flow texture. Regardless of concentration, the alkali-treated carrageenan in undegraded condition could not produce a similar texture. This likewise was the case with iota carrageenan either as it occurs naturally or after degradation without alkali treatment.

Example C

This example is illustrative of a solid particulate composition adapted to be added to cold milk to produce a chocolate beverage:

|   | Gms. |
|---|---|
| Instant chocolate mix (e.g., Nestle's Quik) | 15 |
| Degraded modified iota carrageenan | 0.4 |

The degraded modified iota carrageenan, as prepared in Example 1, had a water viscosity of 0.8 centipoise at 75° C. and at a concentration of 1.5%. The ratio of 3,6-anhydro-galactose groups to galactose groups was greater than 0.8 to 1.

The composition was spoon-stirred into 1 cup of cold milk for 30 seconds. In the resulting chocolate milk the cocoa particles were excellently suspended and the beverage had a rich mouth feel. A control without the carrageenan was watery and the cocoa particles began to settle immediately. A corresponding composition prepared with the undegraded counterpart of the degraded modified iota carrageenan neither exhibited viscosity increase nor cocoa suspension since the carrageenan was not soluble in cold milk.

Example D

This example illustrates the utilization of a degraded modifying hydrocolloid embodying this invention so as to impart in a novel way a spreadable jelly-like consistency to maple syrup.

Degraded kappa carrageenan, as prepared in Example 3, was added to a commercial maple syrup so as to constitute 1% by weight thereof. The water viscosity of the kappa carrageenan was from 0.5 to 1.0 centipoise at 1.5% concentration and at 75° C. The ratio of 3,6-anhydrogalactose groups to galactose groups was about .95 to 1 and the sulfate content was about 26% by weight. The mixture was heated to about 93° C. and then cooled. The resulting product had a smooth, jelly-like consistency with no water release.

A corresponding preparation utilized undegraded alkali-modified carrageenan and resulted in a solid gel mass which could not be spread.

Example E

This example illustrates the utilization of degraded modified furcellaran or kappa carrageenan in the production of a novel instant low calorie jelly. The following is a typical formulation for a 30% sugar solids jelly embodying this invention:

|   | Gms. |
|---|---|
| Sugar | 75.00 |
| Potassium citrate | 0.62 |
| Citric acid | 1.23 |
| Degraded modified kappa carrageenan or furcellaran | 2.00 |
| Water, 1.00 cup. | |

The degraded modified kappa carrageenan corresponded to that employed in Example D. The degraded modified furcellaran corresponded to that prepared according to Example 4, its water viscosity at 1.5 concentration and at 75° C. being from 0.5 to 1 centipoise. The jelly was prepared simply by adding boiling water to a blend of the dry ingredients, stirring and allowing to cool. The resulting gel could easily be spread and contained visible discrete gel particles which gave the impression of crushed fruit.

A corresponding preparation was made except that a lime-treated kappa carrageenan was used in the undegraded state and it was unsatisfactory since the kappa carrageenan because of its high molecular weight was not soluble in the hot water. A furcelaran prepared in similar fashion was also unsatisfactory.

This example and the preceding example are illustrative of difficulties encountered in the stabilization of aqueous compositions which have a high solids content and which require stabilization at a desired consistency. Usually in such products the high solids content results from the presence of sugar. In any case, the amount of water in relation to the total weight of the composition as a whole is relatively small. Under such conditions stabilization at a desired consistency is difficult because amounts of carrageenan or other similar hydrocolloids required for stabilization tend to impart a stiff, rubbery gel consistency or an undesirable stringy consistency which cannot be effectively overcome whether the hydrocolloid is in its natural state or is merely degraded or is merely lime-treated to increase its gelling properties. The new degraded modified hydrocolloids of this invention are highly effective in products of this type in imparting desirable consistency coupled with stabilization and capacity to suspend suspended particulate matter when any is present. The degraded modified hydrocolloids of this invention afford useful novel products wherein the solids content is 30% or more by weight of the total.

I claim:

1. A degraded modified sulfated hydrocolloid selected from the group consisting of kappa-carrageenan, furcellaran, and iota-carrageenan which consists essentially of glycosidically linked hexose groups in the form of 3,6-anhydro-d-galactose groups and d-galactose groups containing sulfate to the extent of 12% to 35% by weight of said hydrocolloid, said hydrocolloid being characterized in that the ratio of 3,6-anhydro-galactose groups to galactose groups is from 0.8:1 to 1:1 and in that the viscosity in a 1.5% water solution is between 0.4 and 4 centipoises at 75° C.

2. Degraded modified iota carrageenan soluble in and capable of suspending cocoa particles in cold milk wherein the ratio of 3,6-anhydro-galactose groups to galactose groups is from 0.8:1 to 1:1 and the viscosity of which at 75° C. in a 1.5% water solution is between 0.7 and 3 centipoises.

3. Degraded modified kappa carrageenan capable of forming in an aqueous medium a spreadable jelly wherein the ratio of 3,6-anhydro-galactose groups to galactose groups is from 0.8:1 to 1:1 and the viscosity of which at 75° C. in a 1.5% water solution is between 0.6 and 2 centipoises.

4. Degraded modified furcellaran capable of forming in an aqueous medium a spreadable jelly wherein the ratio of 3,6-anhydro-galactose groups to galactose groups is from 0.8:1 to 1:1 and the viscosity of which at 75° C. in a 1.5% water solution is between 0.6 and 2.0 centipoises.

5. A method of treating a sulfated hydrocolloid of the group consisting of kappa-carrageenan, furcellaran, and iota-carrageenan which consist essentially of glycosidically linked hexose groups in the form of 3,6-anhydro-galactose and galactose groups containing sulfate in the form of the half ester to the extent of 12% to 35% by weight of the hydrocolloid to modify said hydrocolloid and impart useful modified properties, said method comprising the steps of (a) heating said hydrocolloid in an aqueous alkaline medium at a temperature of 80° to 150° C. to increase the ratio of 3,6-anhydro-galactose groups to galactose groups to the range from 0.8:1 to 1:1, and (b) hydrolyzing said hydrocolloid in an acidic aqueous medium or in an aqueous medium containing hydrogen peroxide to reduce to between 0.4 and 4 centipoises at 75° C. the viscosity of a 1.5 percent water solution of said hydrocolloid wherein the ratio of 3,6-anhydro-galactose groups to galactose groups is from 0.8:1 to 1:1.

6. A method as claimed in claim 5 in which said sulfated hydrocolloid is kappa carrageenan, said viscosity is reduced to between 0.6 and 2 centipoises, and said useful modified properties include the capability of forming in an aqueous medium a spreadable jelly.

7. A method as claimed in claim 5 in which said sulfated hydrocolloid is iota carrageenan, said viscosity is reduced to between 0.7 and 3 centipoises, and said useful modified properties include solubility in cold milk and capability of suspending cocoa particles therein.

8. A method as claimed in claim 5 in which said sulfated hydrocolloid is furcellaran, said viscosity is reduced to between 0.6 and 2 centipoises, and said useful modified properties include the capability of forming in an aqueous medium a spreadable jelly.

References Cited
UNITED STATES PATENTS

| | | | |
|---|---|---|---|
| 3,094,517 | 6/1963 | Stanley | 260—209 R |
| 3,176,003 | 3/1965 | Stancioff | 260—209 R |
| 3,280,102 | 10/1966 | Gordon et al. | 260—209 R |
| 3,342,612 | 9/1967 | Foster et al. | 260—209 R |

JOHNNIE R. BROWN, Primary Examiner

U.S. Cl. X.R.
426—116, 172, 174, 190

UNITED STATES PATENT OFFICE
CERTIFICATE OF CORRECTION

Patent No. 3,849,395　　　　　　　　　Dated November 19, 1974

Inventor(s) Arthur L. Moirano

It is certified that error appears in the above-identified patent and that said Letters Patent are hereby corrected as shown below:

Col. 1, line 57, change "resdiual" to --residual--.

Col. 2, line 41, change "gel" to --gels--.

Col. 4, line 48, "stringly" should be --stringy--.

Col. 4, line 49, after "not easily" insert --spread--.

Col. 4, line 70, after "followed by the" insert --hydrolysis or whether the hydrolysis is done first followed by the--.

Col. 4, line 72, change "thec alcium" to --the calcium--.

Col. 5, line 23, change "cause" to --caused--.

Col. 8, line 3, change ".02" to --.92--.

Col. 9, line 61, change ".05%" to --.5%--.

Col. 11, line 3, change "furcelaran" to --furcellaran--.

Signed and sealed this 18th day of February 1975.

(SEAL)
Attest:

RUTH C. MASON
Attesting Officer

C. MARSHALL DANN
Commissioner of Patents
and Trademarks